US008836253B2

(12) United States Patent
Kato et al.

(10) Patent No.: US 8,836,253 B2
(45) Date of Patent: Sep. 16, 2014

(54) CONTROL APPARATUS FOR AC ROTARY MACHINE

(75) Inventors: Sho Kato, Tokyo (JP); Hisanori Yamasaki, Tokyo (JP); Keita Hatanaka, Tokyo (JP); Hidetoshi Kitanaka, Tokyo (JP); Yoshinori Yamashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 72 days.

(21) Appl. No.: 13/809,451

(22) PCT Filed: Mar. 25, 2011

(86) PCT No.: PCT/JP2011/057305
§ 371 (c)(1),
(2), (4) Date: Jan. 10, 2013

(87) PCT Pub. No.: WO2012/014526
PCT Pub. Date: Feb. 2, 2012

(65) Prior Publication Data
US 2013/0113398 A1    May 9, 2013

(30) Foreign Application Priority Data

Jul. 28, 2010  (JP) .................................. 2010-168782

(51) Int. Cl.
*H02P 6/18* (2006.01)
(52) U.S. Cl.
USPC .............. 318/400.02; 318/400.17; 318/400.3; 318/400.33
(58) Field of Classification Search
USPC ............... 318/400.02, 400.17, 400.3, 400.33
See application file for complete search history.

(56) References Cited

U.S. PATENT DOCUMENTS

| | | | | |
|---|---|---|---|---|
| 5,585,709 A | * | 12/1996 | Jansen et al. .................. | 318/807 |
| 6,037,742 A | * | 3/2000 | Rasmussen .................... | 318/807 |
| 6,313,603 B1 | * | 11/2001 | Poullain et al. ............... | 318/809 |

(Continued)

FOREIGN PATENT DOCUMENTS

| | | |
|---|---|---|
| JP | 2002 233199 | 8/2002 |
| JP | 2004 015891 | 1/2004 |
| JP | 2006 311770 | 11/2006 |
| JP | 2009 268304 | 11/2009 |

OTHER PUBLICATIONS

U.S. Appl. No. 13/809,215, filed Jan. 9, 2013, Kato, et al.
U.S. Appl. No. 13/809,674, filed Jan. 11, 2013, Kato, et al.

(Continued)

*Primary Examiner* — Paul Ip
(74) *Attorney, Agent, or Firm* — Oblon, Spivak, McClelland, Maier & Neustadt, L.L.P.

(57) ABSTRACT

A control apparatus for an AC rotary machine includes: a current detection section detecting current from a power converter to the AC rotary machine; and a control section generating a three-phase AC voltage instruction to the power converter, based on current detected by the current detection section and a torque instruction. The control section includes: an observer calculating a magnetic flux estimated value of the AC rotary machine, based on detected current and the voltage instruction; a current instruction calculation unit calculating current instruction values on rotational two axes, based on the torque instruction and the magnetic flux estimated value from the observer; and a voltage instruction calculation unit calculating the voltage instruction, based on the current instruction values from the current instruction calculation unit and the magnetic flux estimated value from the observer.

5 Claims, 9 Drawing Sheets

(56) References Cited

U.S. PATENT DOCUMENTS

| | | | |
|---|---|---|---|
| 6,674,261 B2* | 1/2004 | Takahashi et al. | 318/721 |
| 6,909,290 B2* | 6/2005 | Imai et al. | 324/545 |
| 8,058,824 B2* | 11/2011 | Williams et al. | 318/265 |
| 8,115,428 B2* | 2/2012 | Williams et al. | 318/400.02 |
| 8,143,837 B2* | 3/2012 | Ide | 318/802 |
| 2003/0030406 A1* | 2/2003 | Takahashi et al. | 318/714 |
| 2004/0066205 A1* | 4/2004 | Imai et al. | 324/709 |
| 2007/0227773 A1* | 10/2007 | Ono et al. | 175/24 |
| 2009/0179602 A1* | 7/2009 | Hayashi et al. | 318/400.02 |
| 2009/0218965 A1* | 9/2009 | Williams et al. | 318/265 |
| 2010/0164429 A1* | 7/2010 | Ide | 318/802 |
| 2012/0194113 A1* | 8/2012 | Lee et al. | 318/400.33 |

OTHER PUBLICATIONS

Takeda, Y., et al., "Design and control of embedded-magnet synchronous motor," Ohmsha, pp. 22-27, (Oct. 25, 2001) (with Partial English translation).

International Search Report Issued Jun. 14, 2011 in PCT/JP11/57305 Filed Mar. 25, 2011.

* cited by examiner

CONTROL APPARATUS FOR AC ROTARY MACHINE

TECHNICAL FIELD

The present invention relates to a control apparatus which controls the torque of an AC rotary machine based on a torque instruction.

BACKGROUND ART

A control apparatus that converts DC voltage to AC voltage by a power converter and performs drive control for an AC rotary machine is generally used. In general, in order to drive the AC rotary machine with high efficiency, such a control apparatus for an AC rotary machine controls the torque by controlling the current of the AC rotary machine in accordance with sine wave PWM (Pulse Width Modulation) control based on vector control.

On the other hand, in the case where the AC rotary machine is driven with a relatively high frequency, it is necessary to maximize the electric motor drive voltage based on the DC voltage, and a drive method using a square wave voltage having a constant peak value is employed. In the square wave driving, the peak value of the voltage waveform based on switching control is constant, and the torque caused by the electric motor can be operated by operating the phase of the voltage waveform. For example, in the case of a permanent magnet synchronous electric motor, the torque can be operated by operating the voltage waveform phase relative to the rotor position.

However, the torque caused by the AC rotary machine varies along with the variation in parameters of the AC rotary machine (for example, in the case of a permanent magnet synchronous electric motor, the parameters are permanent magnet magnetic flux, inductance, and armature resistance). For example, if inductance is reduced by magnetic saturation due to applying the current to the AC rotary machine or if demagnetization occurs due to increase in the magnet temperature by heat generation, the output torque of the AC rotary machine reduces.

In order to cope with the above problem, the following control apparatus for an AC rotary machine is disclosed. That is, the control apparatus for an AC rotary machine performs torque control for the AC rotary machine over a wide rotation rate region from zero to a high speed while appropriately switching the above-described drive methods of the power converter (sine wave PWM control method or square wave drive method) in accordance with the operation condition of the AC rotary machine (typically, the induced voltage, torque, and rotation rate of the AC rotary machine), and performs feedback control by estimating the output torque of the AC rotary machine in order to suppress torque variation (for example, see Patent Document 1 shown below).

According to Patent Document 1, the control method for voltage conversion in the power converter is selectively set in accordance with the operation condition of the AC rotary machine. That is, if control method selection means selects a first control method to apply square wave voltage to the AC rotary machine, the torque control is performed by feedback control adjusting the phase of the square wave voltage in accordance with the torque deviation from a torque instruction value in the torque control. In addition, if the control method selection means selects a second control method to control the voltage applied to the AC rotary machine in accordance with the pulse width modulation method using vector control, the torque control is performed by feedback control for the current of the AC rotary machine.

Thus, when the second control method is selected, feedback control for the current of the AC rotary machine is performed including the same feedback control as in the first control method which is performed in accordance with the torque deviation. Therefore, motor current control can be performed so as to compensate the variation in the torque characteristic of the AC rotary machine which depends on temperature variation or the like. As a result, it becomes possible to prevent occurrence of the torque variation due to magnet temperature variation or the like without particularly providing a temperature sensor or the like. In addition, since both the first and second control methods perform the feedback control in accordance with the torque deviation, it is possible to prevent occurrence of the torque variation upon switching between the control methods.

CITATION LIST

Patent Document

Patent Document 1: Japanese Laid-Open Patent Publication No. 2006-311770

SUMMARY OF THE INVENTION

Problems to be Solved by the Invention

As described above, a conventional control apparatus for an AC rotary machine estimates torque from the output power of a power converter. However, the output power of the power converter includes power converter loss and motor loss which do not contribute to the torque. Therefore, a method of estimating the torque from the output power as in the conventional control apparatus includes error due to these losses, thereby making it difficult to accurately control the torque.

Among conventional techniques, a method of estimating torque from the parameters of an AC rotary machine is also proposed, as disclosed in Japanese Laid-Open Patent Publication No. 2002-233199 (hereinafter, referred to as Patent Document 2), for example. However, it is difficult to accurately perform torque control because the parameter variation influences estimation of the torque.

The present invention has been made to solve the above problems, and an object of the present invention is to, in a control apparatus for an AC rotary machine which performs torque control for the AC rotary machine over a wide rotation rate region from zero to a high speed, even if the parameters of the AC rotary machine vary as described above, accurately control the torque of the AC rotary machine and suppress occurrence of the torque variation due to the variation in the parameters of the AC rotary machine.

Solution to the Problems

A control apparatus for an AC rotary machine according to the present invention includes: a power converter which converts DC power to AC power and supplies the AC power to the AC rotary machine; a current detection section which detects current flowing from the power converter to the AC rotary machine; and a control section which generates a three-phase AC voltage instruction for controlling the AC rotary machine, to the power converter, based on the detected current detected by the current detection section and a torque instruction value, wherein the control section has: an observer which calculates a magnetic flux estimated value of the AC rotary machine, based on the detected current and the voltage instruction; a current instruction calculation unit which calculates current instruction values on rotational two axes, based on the torque instruction value, and the magnetic flux estimated value obtained by the observer; and a voltage instruction calculation unit which calculates the voltage instruction, based on the current instruction values obtained by the current instruction calculation unit and the magnetic flux estimated value obtained by the observer.

Effect of the Invention

According to the present invention, if the parameters of the AC rotary machine have varied to cause deviation from the torque instruction of the control section, the observer estimates the magnetic flux of the AC rotary machine, taking the error into consideration, so that the variation in the magnetic flux estimated value reflects therein the variation in the parameters. Further, by using the magnetic flux estimated value estimated by the observer for the current instruction calculation unit and the voltage instruction calculation unit, it is possible to calculate an optimum current instruction value and an optimum voltage instruction value taking the parameter variation into consideration. Thus, it becomes possible to accurately control the torque and current of the AC rotary machine even in a control system that does not use a feedback current control system.

DESCRIPTION OF EMBODIMENTS

Embodiment 1

Figure 1:
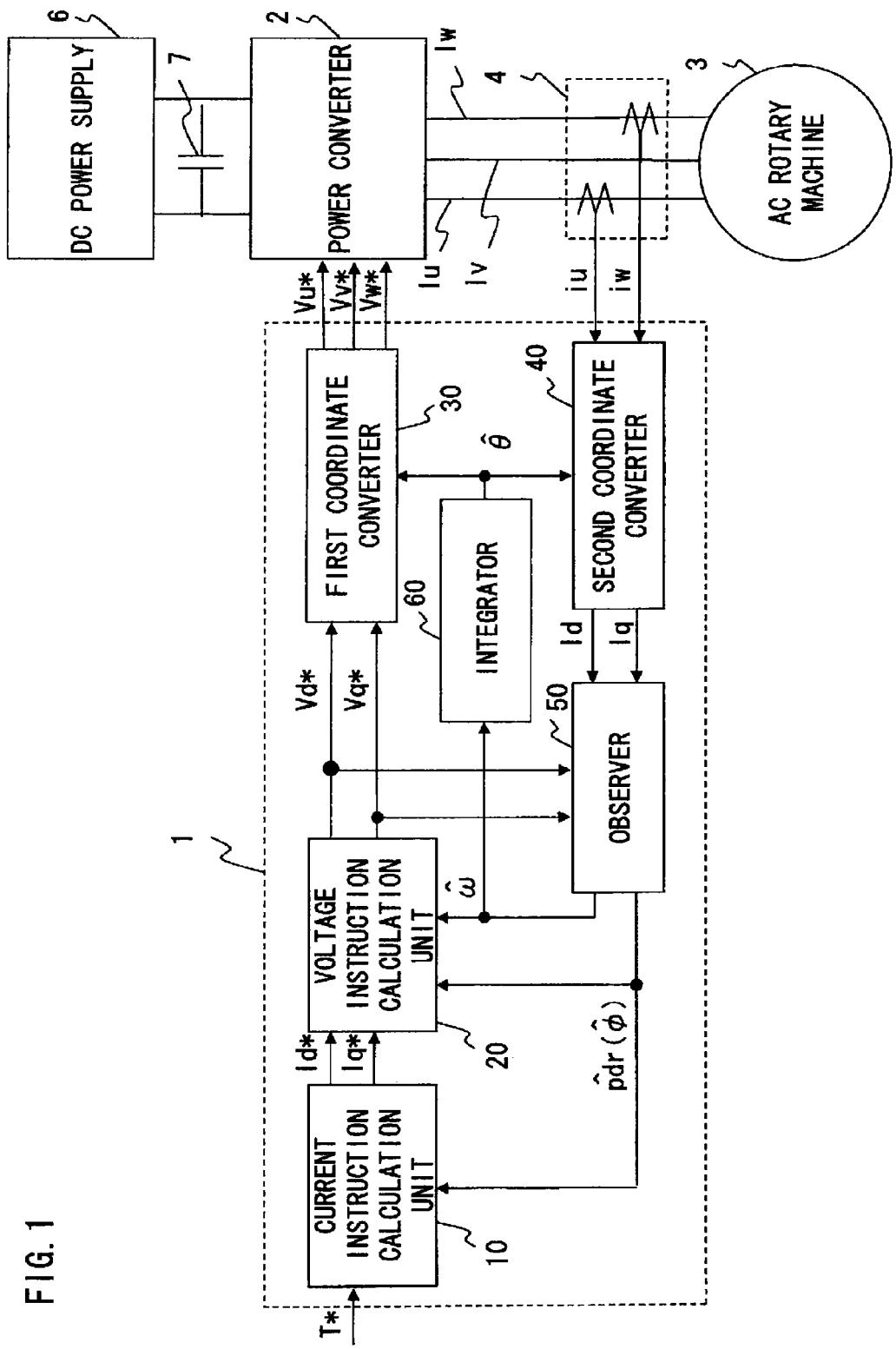
FIG. 1 is a block diagram of a control apparatus for an AC rotary machine according to embodiment 1 of the present invention.

FIG. 1 is a block diagram showing a control apparatus for an AC rotary machine according to embodiment 1 of the present invention.

The control apparatus for an AC rotary machine of embodiment 1 includes a control section 1, a power converter 2, and a current detection section 4. A DC power supply 6 is connected to the input side of the power converter 2, and an AC rotary machine 3 is connected to the output side of the power converter 2.

Here, the above DC power supply 6 is not limited to a battery, but may be, for example, a converter which converts AC power to DC power, or DC overhead wires for directly receiving DC power via a pantograph of rail vehicles or the like. In addition, in embodiment 1, the AC rotary machine 3 is a synchronous electric motor using permanent magnet, and is connected to the power converter 2 via three-phase AC feed paths Iu, Iv, and Iw.

The power converter 2 is, for example, a three-phase power converter of variable-voltage and variable-frequency type, and converts DC power from the DC power supply 6 to three-phase AC power, to supply the three-phase AC power to the AC rotary machine 3. In this case, the power converter 2 has three-phase conversion circuits for U, V, and W phases (not shown) connected, in parallel with each other, to the DC power supply 6. As is well known, each conversion circuit has a pair of switches on the positive and negative sides, and the three-phase AC feed paths Iu, Iv, and Iw are connected between the respective pairs of switches of the conversion circuits. The power converter 2 receives voltage instructions Vu*, Vv*, and Vw* from the control section 1, and when converting DC power to three-phase AC power, generates three-phase AC power having controlled output voltage and controlled angular frequency based on the voltage instructions Vu*, Vv*, and Vw*.

The current detection section 4 is provided on, for example, the AC feed paths Iu, Iv, and Iw, and detects current based on AC phase current flowing from the power converter 2 to the AC rotary machine 3, that is, U-phase current iu, V-phase current iv, and W-phase current iw. It is noted that in embodiment 1, the current detection section 4 is provided for two phases of the AC current. If the three phases are in equilibrium, the other one phase can be calculated and outputted based on only signals for the two phases by using the relationship of iu+iv+iw=0.

The control section 1 performs sensorless vector control for the AC rotary machine 3, in which vector control can be performed without a rotation position sensor or a rotation rate sensor. The control section 1 includes a current instruction calculation unit 10, a voltage instruction calculation unit 20, first and second coordinate converters 30 and 40, an observer 50, and an integrator 60. Particularly, a feature of the control section 1 of embodiment 1 is that the observer 50 estimates and calculates the magnetic flux of the AC rotary machine 3 so that the magnetic flux estimated value $\hat{\phi}$ is used for calculation by the current instruction calculation unit 10 and the voltage instruction calculation unit 20. The details thereof will be described later.

Figure 2:
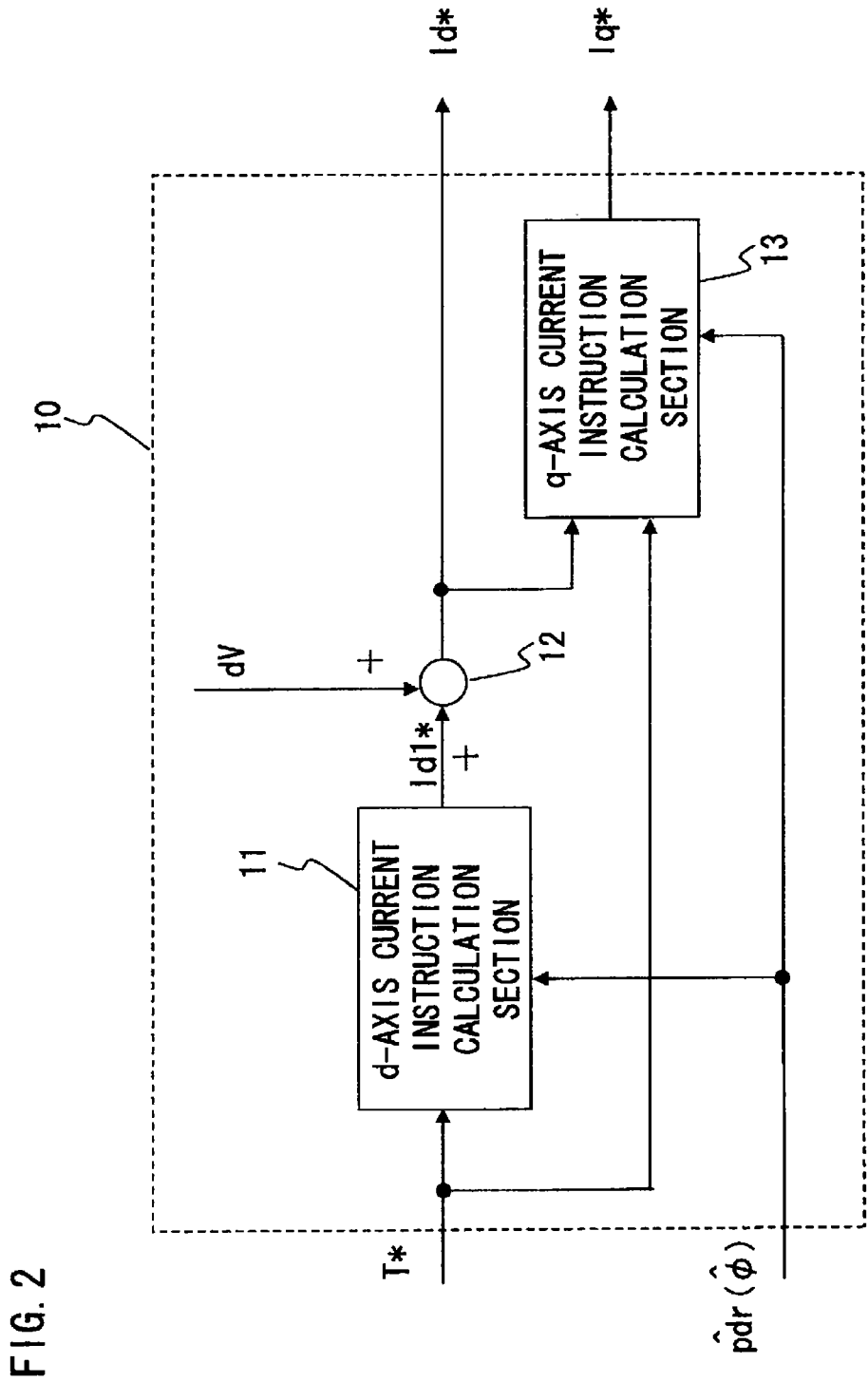
FIG. 2 is a block diagram of a current instruction calculation unit of the control apparatus for an AC rotary machine according to embodiment 1 of the present invention.

Here, first, an example of the configuration of the current instruction calculation unit 10 will be described with reference to FIG. 2.

The current instruction calculation unit 10 generates current instructions Id* and Iq* from torque instruction T* which is a control target value. The torque instruction value T* is inputted to a d-axis current instruction calculation section 11 to generate a first d-axis current instruction value Id1*. As a calculation method for the first d-axis current instruction value Id1*, a maximum torque control method is known which allows the AC rotary machine 3 to generate desired torque with the minimum current, and which obtains an optimum first d-axis current instruction value Id1* by a calculation expression, based on the torque instruction value T* (for example, see pp. 23-24 of Yoji Takeda and others, "Design and control of embedded-magnet synchronous motor", Ohmsha, published on Oct. 25, 2001, which is hereinafter referred to as Non-Patent Document 1).

According to Non-Patent Document 1, the above method is referred to as maximum torque/ampere control. Although the d-axis current instruction calculation section 11 can be configured based on a known technique, parameter variation of an AC rotary machine is not described therein. Therefore, if the parameters of the AC rotary machine vary, the maximum torque/ampere control cannot be accurately realized. Accordingly, in embodiment 1, the magnetic flux estimated value $\hat{\phi}$ (particularly, here, a rotor-side d-axis magnetic flux estimated value $\hat{p}dr$) of the AC rotary machine 3 estimated by the observer 50 described later is used in a calculation expression for obtaining the first d-axis current instruction value Id1* based on the torque instruction value T*. The influence of the parameter variation is reflected in the magnetic flux estimated value $\hat{\phi}$. Therefore, by using the magnetic flux estimated value $\hat{\phi}$, even if the parameters of the AC rotary machine 3 vary, optimum current instruction values Id* and Iq* can be obtained, whereby the maximum torque/ampere control can be realized.

Specifically, the first d-axis current instruction value Id1* is calculated by a calculation expression shown by the following expression (1). A feature of expression (1) is that a term originally corresponding to a permanent magnet magnetic flux $\phi a$ (Wb) in the conventional known technique is replaced with the magnetic flux estimated value $\hat{\phi}$ ($\hat{p}dr$) of the AC rotary machine 3 estimated by the observer 50. It is noted that the details of the derivation process for the calculation expression shown by expression (1) will be described later.

[Expression 1]

$$Id1^* = \frac{-\{(aP\hat{p}dr) + bP(Ld^* - Lq^*)\} \pm \sqrt{\{(aP\hat{p}dr) + bP(Ld^* - Lq^*)\}^2 - 4\{aP(Ld^* - Lq^*)\}(bP\hat{p}dr - T^*)}}{2\{aP(Ld^* - Lq^*)\}} \quad (1)$$

Here, Id1* is the first d-axis current instruction value (A), Ld* is a d-axis inductance set value (H), Lq* is a q-axis inductance set value (H), P is a pole pair number, a is a slope of a maximum torque/ampere control curve, and b is an intercept of a maximum torque/ampere control curve.

It is noted that the d-axis current instruction calculation section 11 can also employ a method of obtaining an optimum first d-axis current instruction value Id1* by referring to a map based on the torque instruction value T*. However, in the method using a map, it is necessary to prepare a map including all magnetic flux estimated values corresponding to the parameter variation, and therefore this method is difficult to apply.

When the first d-axis current instruction value Id1* has been generated, next, the adder 12 adds a weakening current instruction value dV to the first d-axis current instruction value Id1*, thereby obtaining a final d-axis current instruction value Id*. Specifically, the d-axis current instruction value Id* is calculated by expression (2).

[Expression 2]

$$Id^* = Id1^* + dV \quad (2)$$

Here, the weakening current instruction value dV is zero or a negative value, and is provided for the purpose of performing so-called magnetic flux weakening control which corrects the first d-axis current instruction value Id1* in the negative direction to increase the d-axis current instruction value Id* in the negative direction, thereby generating magnetic flux in a direction to cancel magnetic flux generated by the permanent magnet of the AC rotary machine 3, thus weakening interlinkage magnetic flux of the AC rotary machine 3. In addition, in the case where torque control is performed in a region where the AC rotary machine 3 rotates at a high speed and magnetic flux weakening control is performed, it is extremely important to set the position for adding the weakening current instruction value dV, as shown in the configuration of embodiment 1. It is noted that a generation method for the weakening current instruction value dV can be configured based on a known technique. Therefore, the detailed description thereof is omitted here.

Finally, the q-axis current instruction calculation section 13 generates the q-axis current instruction value Iq* from the d-axis current instruction value Id* and the torque instruction value T*. As a generation method for the q-axis current instruction value Iq*, an optimum q-axis current instruction value Iq* can be obtained by referring to a map, or an optimum q-axis current instruction value Iq* can be obtained by using a calculation expression, as described above. However, the method of referring to a map has a problem that it is difficult to prepare a map completely covering the parameter variation.

Accordingly, embodiment 1 employs a method based on a calculation expression shown by the following expression (3) using the magnetic flux estimated value $\hat{\phi}$ ($\hat{p}dr$) of the AC rotary machine 3 estimated by the observer 50. Also in expression (3), a term originally corresponding to the permanent magnet magnetic flux $\phi a$ (Wb) is replaced with the magnetic flux estimated value $\hat{\phi}$ ($\hat{p}dr$), similarly to expression (1). By using the magnetic flux estimated value $\hat{\phi}$, even if the parameters of the AC rotary machine 3 vary, an optimum q-axis current instruction value Iq* can be calculated taking the parameter variation into consideration.

[Expression 3]

$$Iq^* = \frac{T^*}{P\{\hat{p}dr + (Ld^* - Lq^*)Id^*\}} \quad (3)$$

Owing to the configuration of the current instruction calculation unit 10 as described above, even if the parameters of the AC rotary machine 3 vary, the influence of the parameter variation is reflected in the magnetic flux estimated value $\hat{\phi}$ ($\hat{p}dr$: the rotor-side d-axis magnetic flux estimated value) of the AC rotary machine 3 estimated by the observer 50. Therefore, an optimum d-axis current instruction Id* can be generated by the maximum torque/ampere control, and further, the q-axis current instruction value Iq* can be generated, taking the parameter variation into consideration, based on the torque instruction T*. Thus, it becomes possible to accurately control the torque even if the parameters vary.

Next, the procedure to derive the previously-described expressions (1) and (3) for performing the maximum torque/ampere control will be described.

The condition for realizing the maximum torque/ampere control is as shown by the following expression (4) (see aforementioned Non-Patent Document 1).

[Expression 4]

$$id = \frac{\phi a}{2(Lq - Ld)} - \sqrt{\frac{\phi a^2}{4(Lq - Ld)^2} + iq^2} \quad (4)$$

Here, Ld is a d-axis inductance (H), Lq is a q-axis inductance (H), φa is permanent magnet magnetic flux (Wb), id is d-axis current (A), and iq is q-axis current (A).

In addition, the torque is given by the following expression (5).

[Expression 5]

$$T = P\{\phi a\, iq + (Ld - Lq)id\, iq\} \quad (5)$$

Expression (5) is deformed for iq, to obtain the following expression (6).

[Expression 6]

$$iq = \frac{T}{P\{\phi a + (Ld - Lq)id\}} \quad (6)$$

If simultaneous equations composed of expressions (4) and (6) are solved for id and iq, the current vectors id and iq that allow torque T to be outputted with the minimum current relative to the torque T, can be obtained. However, actually, since the simultaneous equations composed of expressions (4) and (6) will become a fourth-degree equation, they are difficult to solve. Accordingly, approximation is performed as shown below.

Figure 3:
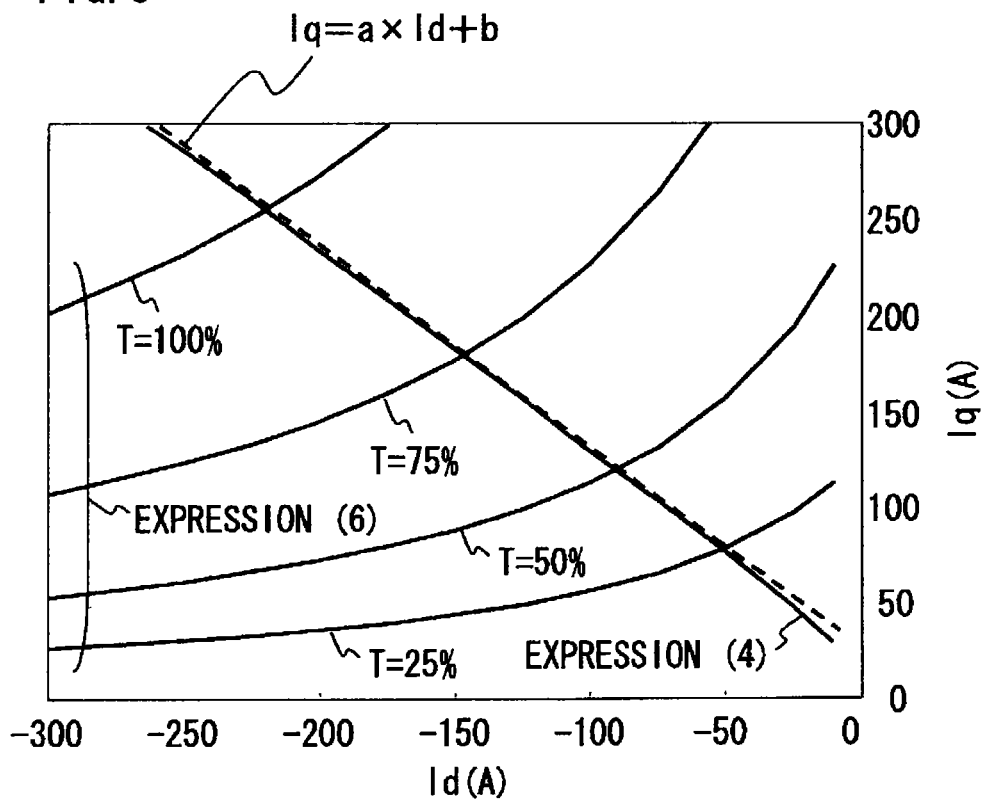
FIG. 3 is an explanation diagram of torque and the minimum current condition in the control apparatus for an AC rotary machine according to embodiment 1 of the present invention.

FIG. 3 is a graph of expressions (4) and (6).

In FIG. 3, curves extending from the upper right to the lower left are curves represented by expression (6) and each corresponding to the torque T=100% to 25%. In addition, a curve (solid line) extending from the upper left to the lower right is a curve represented by expression (4) and corresponding to the minimum current condition. As shown by the curve of expression (4), the minimum current condition is approximately a straight line though represented by a quadratic expression. Therefore, it is considered that there is no practical problem if the minimum current condition is approximated by a linear function. Accordingly, the curve of the minimum current condition shown in FIG. 3 is linearly approximated, to obtain the following expression (7). In FIG. 3, the result of linearly approximating the quadratic curve of expression (4) is indicated by a dashed line.

[Expression 7]

$$iq = a\, id + b \quad (7)$$

Here, in expression (7) shown in FIG. 3, a is a slope of the linear function, and b is an intercept of the linear function. Therefore, id and iq at the intersection of the torque curve and the linearly approximated minimum current condition can be obtained by solving simultaneous equations composed of the above expressions (6) and (7). Since these simultaneous equations will become a quadratic equation, they are easy to solve. Accordingly, expressions (6) and (7) are coordinated to obtain the following expression (8).

[Expression 8]

$$\{aP(Ld - Lq)\}id^2 + \{(aP\phi a) + bP(Ld - Lq)\}id + bP\phi a - T = 0 \quad (8)$$

From expression (8), id is obtained as shown by the following expression (9).

[Expression 9]

$$id = \frac{-\{(aP\phi a) + bP(Ld - Lq)\} \pm \sqrt{\{(aP\phi a) + bP(Ld - Lq)\}^2 - 4\{aP(Ld - Lq)\}(bP\phi a - T)}}{2\{aP(Ld - Lq)\}} \quad (9)$$

Thus, id can be obtained. Further, iq can be obtained by substituting the result of id obtained by expression (9) into the above expression (6).

In the above description, expression (4) representing the curve (solid line) of the minimum current condition is linearly approximated, to be represented by expression (7). However, in some cases, it can be difficult to linearly approximate the curve of the minimum current condition represented by expression (4). In such a case, the slope a and the intercept b corresponding to each torque are obtained in advance, and then the slope a and the intercept b as table values are referred to based on the torque instruction value T*, whereby the maximum torque/ampere control can be realized.

As previously described, even if a set value of each motor parameter of the AC rotary machine 3 is different from the actual parameter value, based on expressions (6) and (9), the current instruction calculation unit 10 performs calculation using the magnetic flux estimated value $\hat{\phi}$ ($\hat{p}dr$: the rotor-side d-axis magnetic flux estimated value) of the AC rotary machine 3 estimated by the observer 50, instead of a term of the permanent magnet magnetic flux φa (Wb) in expressions (6) and (9), thereby generating an optimum current instruction taking the parameter variation into consideration based on the torque instruction T*. That is, in order to realize such operation, the current instruction calculation unit 10 performs calculation using expression (1) obtained by deforming expression (9), and expression (3) obtained by deforming expression (6) (here, id=Id* and iq=Iq* are set). The detailed theory thereof will be described later.

In the above description of the current instruction calculation unit 10, the generation method for a current instruction by the maximum torque/ampere control has been described. However, control using the d-axis current instruction Id*=0 also obtains the same effect.

Figure 4:
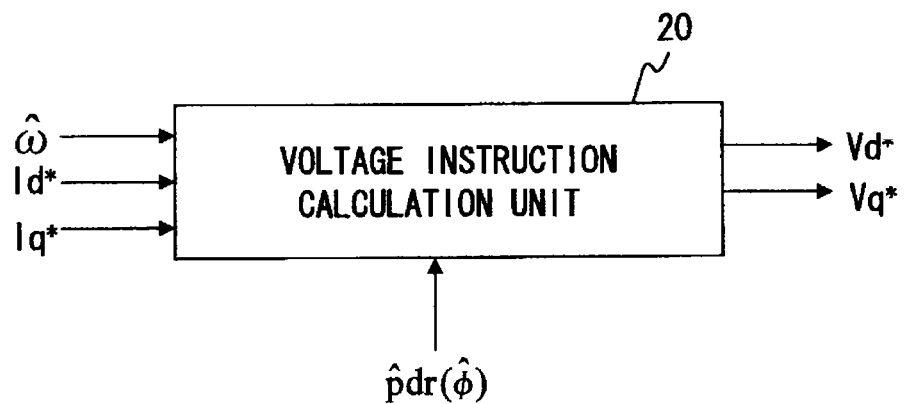
FIG. 4 is a block diagram of a voltage instruction calculation unit of the control apparatus for an AC rotary machine according to embodiment 1 of the present invention.

Next, the configuration of the voltage instruction calculation unit 20 will be described with reference to FIG. 4.

The voltage instruction calculation unit 20 calculates a d-axis voltage instruction value Vd* and a q-axis voltage instruction value Vq*, based on the following expression (10), using the current instructions Id* and Iq* from the current instruction calculation unit 10, and the magnetic flux estimated value $\hat{\phi}$ ($\hat{p}dr$: the rotor-side d-axis magnetic flux estimated value) and an angular velocity estimated value $\hat{\omega}$ of the AC rotary machine 3 estimated by the observer 50. Particularly, the voltage instruction calculation unit 20 calculates the voltage instructions by using the magnetic flux estimated value $\hat{\phi}$ ($\hat{p}dr$) in expression (10) instead of a term of the permanent magnet magnetic flux φa (Wb). Thus, even if the parameters of the AC rotary machine 3 vary, the current of the AC rotary machine can be made to coincide with an instruction value. The detailed theory thereof will be described later.

[Expression 10]

$$\begin{bmatrix} Vd^* \\ Vq^* \end{bmatrix} = \begin{bmatrix} R^* & -\hat{\omega}Lq^* \\ \hat{\omega}Ld^* & R^* \end{bmatrix} \begin{bmatrix} Id^* \\ Iq^* \end{bmatrix} + \begin{bmatrix} 0 \\ \hat{\omega}\hat{p}dr \end{bmatrix} \quad (10)$$

Here, Id* is a d-axis current instruction, Iq* is a q-axis current instruction, Vd* and Vq* are d-q axis component voltage instructions for armature voltage, R* is an armature resistance set value, Ld* and Lq* are d-axis and q-axis inductance set values, $\hat{\omega}$ is an angular velocity estimated value estimated by the observer 50, and $\hat{p}dr$ is a magnetic flux estimated value estimated by the observer 50.

Next, the configurations of the integrator 60 and the first and second coordinate converters 30 and 40 will be described.

The integrator 60 calculates an estimated phase $\hat{\theta}$ from the angular velocity estimated value $\hat{\omega}$ outputted from the observer 50. The first coordinate converter 30 converts voltage instructions in a d-q rotational two-axis coordinate system to the three-phase AC voltage instruction values Vu*, Vv*, and Vw* in a two-axis coordinate system at rest, based on the voltage instructions Vd* and Vq* from the voltage instruction calculation unit 20, and the estimated phase $\hat{\theta}$ calculated by the integrator 60, and outputs the three-phase AC voltage instruction values Vu*, Vv*, and Vw*. The three-phase AC voltage instruction values Vu*, Vv*, and Vw* are inputted to the power converter 2, to perform torque control for the AC rotary machine 3 based on the three-phase AC voltage instruction values Vu*, Vv*, and Vw*. The second coordinate converter 40 converts the three-phase AC currents iu and iw in a coordinate system at rest flowing in the AC feed paths Iu and Iw detected by the current detection section 4, to the current values Id and Iq in a d-q rotational two-axis coordinate system, based on the estimated phase $\hat{\theta}$ calculated by the integrator 60, and outputs the current values Id and Iq.

Next, the configuration of the observer 50 will be described with reference to FIG. 5.

The observer 50 estimates and calculates the angular velocity estimated value $\hat{\omega}$ and the magnetic flux estimated value $\hat{\phi}$ ($\hat{p}dr$: the rotor-side d-axis magnetic flux estimated value) of the AC rotary machine 3 needed for sensorless vector control, based on the voltage instruction values Vd* and Vq* calculated by the voltage instruction calculation unit 20, and the detected currents Id and Iq of the AC rotary machine 3 in a d-q rotational two-axis coordinate system calculated by the second coordinate converter 40. It is noted that the configuration of the observer 50 shown in FIG. 5 is a known technique (for example, disclosed in aforementioned Patent Document 2). The following expressions (11) to (17) show calculation expressions of the observer.

[Expression 11]

$$\begin{cases} \dfrac{d}{dt}\begin{pmatrix} \hat{p}ds \\ \hat{p}qs \\ \hat{p}dr \end{pmatrix} = \begin{pmatrix} -R^*/Ldob & \hat{\omega} & 0 \\ -\hat{\omega} & -R^*/Lqob & -\hat{\omega}r \\ 0 & 0 & 0 \end{pmatrix}\begin{pmatrix} \hat{p}ds \\ \hat{p}qs \\ \hat{p}dr \end{pmatrix} + \begin{pmatrix} Vd^* \\ Vq^* \\ 0 \end{pmatrix} - \begin{pmatrix} A \\ B \\ C \end{pmatrix} \\ \begin{pmatrix} \hat{I}d \\ \hat{I}q \end{pmatrix} = \begin{pmatrix} 1/Ldob & 0 & 0 \\ 0 & 1/Lqob & 0 \end{pmatrix}\begin{pmatrix} \hat{p}ds \\ \hat{p}qs \\ \hat{p}dr \end{pmatrix} \end{cases} \quad (11)$$

[Expression 12]

$$\begin{cases} eds = \hat{I}d - Id \\ eqs = \hat{I}q - Iq \end{cases} \quad (12)$$

[Expression 13]

$$\begin{cases} H = \begin{bmatrix} h11 & h12 \\ h21 & h22 \\ h31 & h32 \\ h41 & h42 \end{bmatrix} \\ \begin{bmatrix} A \\ B \\ C \\ D \end{bmatrix} = \begin{bmatrix} h11 & h12 \\ h21 & h22 \\ h31 & h32 \\ h41 & h42 \end{bmatrix}\begin{bmatrix} eds \\ eqs \end{bmatrix} = \begin{bmatrix} h11eds + h12eqs \\ h21eds + h22eqs \\ h31eds + h32eqs \\ h41eds + h42eqs \end{bmatrix} \end{cases} \quad (13)$$

-continued

[Expression 14]

$$\begin{cases} \hat{\dot{\omega}}r = \left(Kp + \dfrac{Ki}{s}\right)\dfrac{eqs}{\hat{p}dr} \\ \hat{\omega}r = \dfrac{1}{s}\hat{\dot{\omega}}r \\ \hat{\omega} = \hat{\omega} - \dfrac{D}{\hat{p}dr} \end{cases} \quad (15)$$

Here, in each expression, a suffix * means an instruction value, a suffix ob means a set value of the observer 50, a suffix r means a rotor, a suffix s means a stator, and a suffix $\hat{\ }$ means an estimated value. It is noted that Ldob and Lqob are set values of d-q axis inductances of the observer 50, R* is the armature resistance set value, $\hat{\omega}$ is the angular velocity estimated value, Vd* and Vq* are the d-q axis voltage instruction values, Id and Iq are the d-q axis current values, $\hat{p}ds$ and $\hat{p}qs$ are primary-side d-q axis magnetic flux estimated values, $\hat{p}dr$ is the rotor-side (secondary-side) d-axis magnetic flux estimated value, $\omega r$ is the angular velocity of the rotor, $\hat{\omega}r$ is an angular velocity estimated value of the rotor, h11, h12, h21, h22, h31, h32, h41, and h42 are feedback gains of the observer 50, and Kp and Ki are an acceleration estimated proportional gain and an acceleration estimated integral gain of the observer 50.

Figure 5:
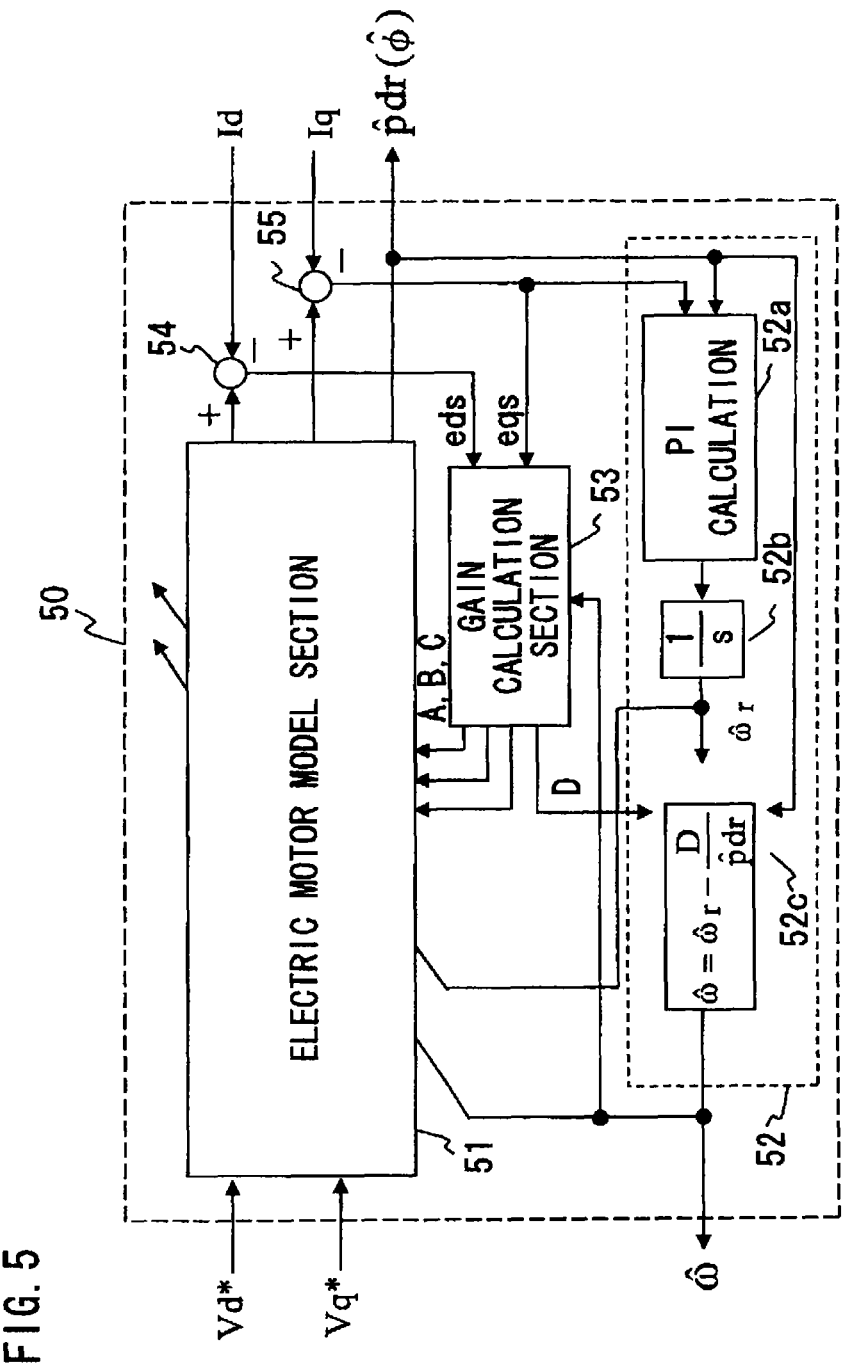
FIG. 5 is a block diagram of an observer of the control apparatus for an AC rotary machine according to embodiment 1 of the present invention.

As shown in FIG. 5, the observer 50 is roughly composed of three elements of an electric motor model section 51, a velocity estimation section 52, and a gain calculation section 53.

The electric motor model section 51 performs calculation of expression (11) which is generally derived from an equation of state of the AC rotary machine 3. Thus, each magnetic flux and each current of the AC rotary machine 3 are estimated and calculated. Expression (11) is a calculation expression for the case where the AC rotary machine 3 is a permanent magnet synchronous electric motor. By setting the calculation expression of the electric motor model section 51 in accordance with the AC rotary machine 3 to be driven, it also becomes possible to apply the present invention to an AC rotary machine other than a permanent magnet synchronous electric motor.

The velocity estimation section 52 receives: the result of calculation by expression (12) for deviations between estimated currents $\hat{I}d$ and $\hat{I}q$ estimated by the electric motor model section 51 and the currents Id and Iq of the AC rotary machine 3 in a d-q rotational two-axis coordinate system calculated by the second coordinate converter 40; and the magnetic flux estimated value $\hat{\phi}$ ($\hat{p}dr$: the rotor-side d-axis magnetic flux estimated value) estimated by the electric motor model section 51. Then, based on the received values, the velocity estimation section 52 calculates the angular velocity estimated value $\hat{\omega}$ of the AC rotary machine 3 through PI (proportional integral) calculation by expression (15) to calculation by expression (17). That is, a PI calculation section 52a performs calculation by expression (15) to output the result, a Laplace transform section 52b performs calculation by expression (16) to output the result, and an estimated velocity calculation section 52c performs calculation by expression (17) to output the result.

The gain calculation section 53 receives estimated current deviations eds and eqs of expression (12), and calculates A, B, C, and D which are feedback terms of the observer, from expressions (13) and (14). Here, H in expression (13) is a feedback gain, that is, a design parameter for realizing stable calculation.

In embodiment 1, by using the above-described configuration, it becomes possible to accurately control the output torque of the AC rotary machine 3 even if the parameters of the AC rotary machine 3 vary.

Next, the torque control performed when the parameters vary, which is a feature of the present invention, will be described, using mathematical expressions, in comparison with a conventional method.

Here, the conventional method is a method for giving the magnet magnetic flux instruction value φ* as a constant value in the current instruction calculation unit 10 and the voltage instruction calculation unit 20. Therefore, in the conventional method, as shown by expressions (4) and (6), since an optimum current instruction is calculated by using the parameters of the AC rotary machine 3, an optimum current instruction cannot be obtained if the parameters of the AC rotary machine 3 vary. Further, also in the following expression (18), since an optimum voltage instruction is calculated by using the parameters of the AC rotary machine 3, a current deviation is left if the parameters of the AC rotary machine 3 vary. As a result, the torque cannot be accurately controlled.

First, the effect obtained by using the magnetic flux estimated value φ^ (p^dr) of the observer 50 for the voltage instruction calculation unit 20 in the present invention, will be described.

The procedure of the description is as follows. First, based on the operation relationship in the stationary state between the voltage instruction calculation unit 20 and the observer 50 in the conventional control method, a relational expression of error factor between a current instruction value and the actual current flowing in the AC rotary machine in the case where the parameters vary, will be shown, using mathematical expressions, from a calculation expression of the conventional voltage instruction calculation unit and a calculation expression of the observer in the stationary state. Then, a relational expression shown by expression (25) described later will be derived. Further, from the relational expression shown by expression (25), it will be shown that if the control method of the present invention is applied, a current instruction value and the actual current flowing in the AC rotary machine 3 coincide with each other.

The following expression (18) shows a calculation expression of the conventional voltage instruction calculation unit 20. The difference from the previously-described expression (10) is that the magnet magnetic flux instruction value φ* is used in expression (18) while the rotor-side d-axis magnetic flux estimated value p^dr is used instead in expression (10). In addition, expression (19) shows a calculation expression of the observer 50, which is obtained by substituting expression (14) into expression (11).

[Expression 15]

$$\begin{cases} Vd^* = R^* Id^* - \hat{\omega} Lq^* Iq^* \\ Vq^* = R^* Iq^* + \hat{\omega}(La^* Id^* + \phi^*) \end{cases} \quad (18)$$

[Expression 16]

$$\begin{cases} \dfrac{d}{dt}\begin{pmatrix} \hat{p}ds \\ \hat{p}qs \\ \hat{p}dr \end{pmatrix} = \begin{pmatrix} -R^*/Ldob & \hat{\omega} & 0 \\ -\hat{\omega} & -R^*/Lqob & -\hat{\omega}r \\ 0 & 0 & 0 \end{pmatrix}\begin{pmatrix} \hat{p}ds \\ \hat{p}qs \\ \hat{p}dr \end{pmatrix} + \begin{pmatrix} Vd^* \\ Vq^* \\ 0 \end{pmatrix} - \begin{pmatrix} h11 & h12 \\ h21 & h22 \\ h31 & h32 \end{pmatrix}\begin{pmatrix} \hat{I}d - Id \\ \hat{I}q - Iq \end{pmatrix} \\ \begin{pmatrix} \hat{I}d \\ \hat{I}q \end{pmatrix} = \begin{pmatrix} 1/Ldob & 0 & 0 \\ 0 & 1/Lqob & 0 \end{pmatrix}\begin{pmatrix} \hat{p}ds \\ \hat{p}qs \\ \hat{p}dr \end{pmatrix} \end{cases} \quad (19)$$

Here, in the above expressions, a suffix * means an instruction value, a suffix ob means a set value of the observer, and a suffix ^ means an estimated value. From expressions (18) and (19), if the velocity is assumed to be in the sufficiently high-speed region and R*=0 is set, and if the stationary state is assumed, d/dt=0, ω^=ω^r, I^d−Id=0, and I^q−Iq=0 are obtained. Therefore, these conditions are substituted into expressions (18) and (19), to obtain expressions (20) and (21).

[Expression 17]

$$\begin{cases} Vd^* = -\hat{\omega} Lq^* Iq^* \\ Vq^* = \hat{\omega}(La^* Id^* + \phi^*) \end{cases} \quad (20)$$

[Expression 18]

$$\begin{cases} 0 = \hat{\omega}\, \hat{p}qs + Vd^* \\ 0 = \hat{\omega}\, \hat{p}ds - \hat{\omega}\, \hat{p}dr + Vq^* \end{cases} \quad (21)$$

Expression (21) is coordinated for the primary-side d-q axis magnetic flux estimated values p^ds and p^qs, to obtain expression (22).

[Expression 19]

$$\begin{cases} \hat{p}ds = Vq^*/\hat{\omega} - \hat{p}dr \\ \hat{p}qs = -Vd^*/\hat{\omega} \end{cases} \quad (22)$$

From expression (22), the current estimated values I^d and I^q are obtained as shown by expression (23). These current estimated values coincide with the actual currents Id and Iq, so that the observer 50 converges in the stationary state.

[Expression 20]

$$\begin{cases} \hat{I}d = \hat{p}ds/Ldob = \dfrac{1}{Ldob}(Vq^*/\omega - \hat{p}dr) = Id \\ \hat{I}q = \hat{p}qs/Lqob = -\dfrac{Vd^*}{\omega Lqob} = Iq \end{cases} \quad (23)$$

Figure 6:
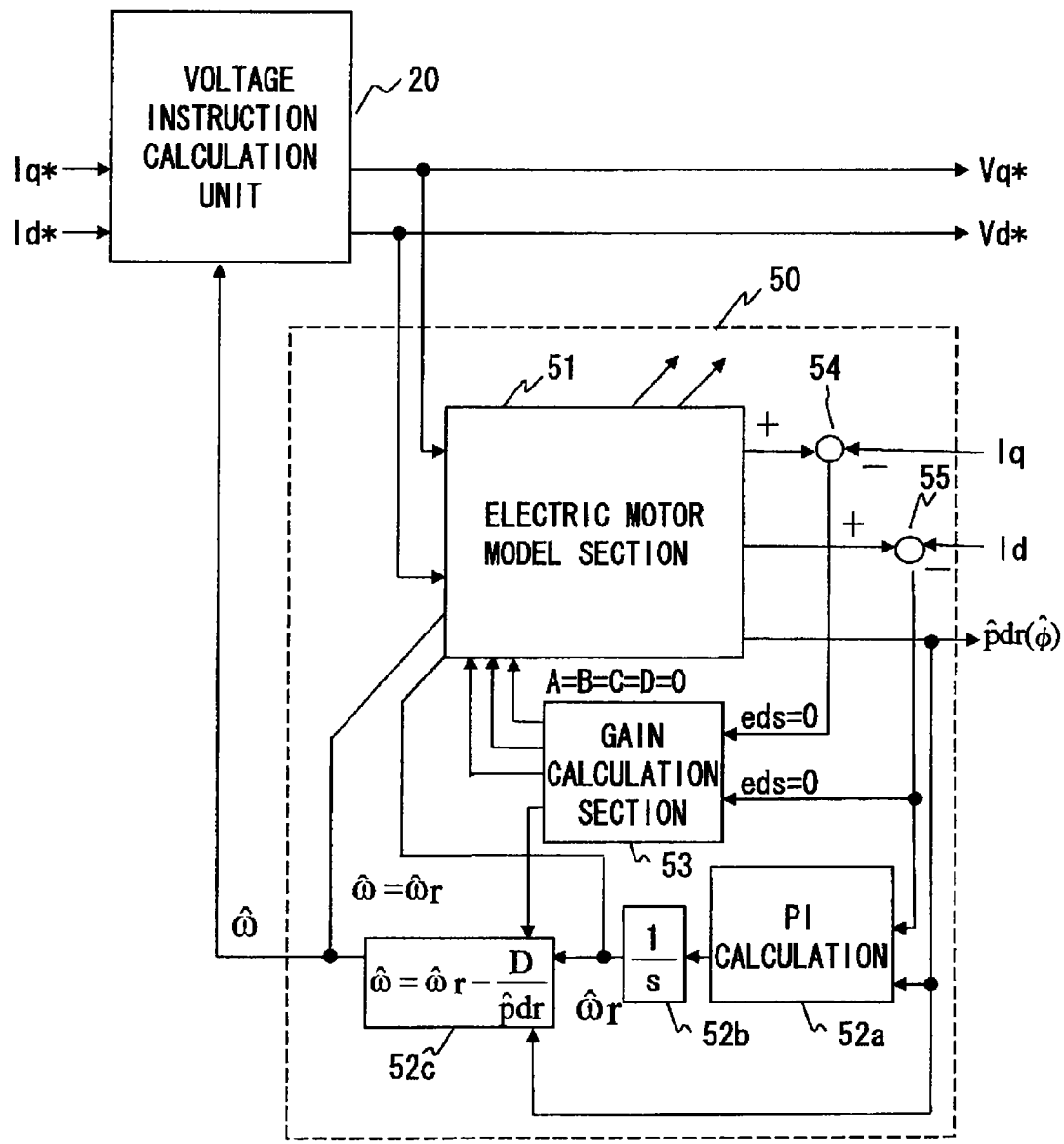
FIG. 6 is a diagram showing the relationship in the stationary state between the voltage instruction calculation unit and the observer of the control apparatus for an AC rotary machine according to embodiment 1 of the present invention.

The relational expressions described above can be represented by a block diagram of the observer 50 in the stationary state as shown in FIG. 6. Here, if voltage instruction values are generated by the voltage instruction calculation unit 20 without performing current feedback control for the AC rotary machine 3, the voltage instruction values which are represented by expression (20) are substituted into expression (23), to obtain expression (24).

[Expression 21]

$$\begin{cases} \hat{I}d = \dfrac{1}{Ldob}((Ld^* Id^* + \phi^*) - \hat{p}dr) = Id \\ \hat{I}q = -\dfrac{Lq^*}{Lqob}Iq^* = Iq \end{cases} \quad (24)$$

Expression (24) represents the relationship between the current instructions Id* and Iq* and the actual currents Id and Iq in the case of using the configuration shown in FIG. 6. Here, if the setting of inductance is assumed as Ld*=Ldob and Lq*=Lqob, expression (25) is obtained.

[Expression 22]

$$\begin{cases} \hat{I}d = Id^* + \dfrac{\phi^* - \hat{p}dr}{Ld^*} = Id \\ \hat{I}q = Iq^* = Iq \end{cases} \quad (25)$$

From expression (25), it is found that the q-axis current and the instruction value coincide with each other. This shows that, even if the parameters vary (Ld≠Ld*, Lq≠Lq*, φa≠φ*), the q-axis current coincides with an instruction value by setting Ld*=Ldob and Lq*=Lqob. In addition, if the parameters vary, such errors (Ld error, Lq error, and φ error) all appear as d-axis current error. Therefore, by configuring a control system so as to remove the d-axis current error, the current can be controlled without performing current feedback control. That is, occurrence of current deviation can be prevented even if the parameters vary. Further, from the d-axis current in expression (25), it is found that, if φ*−p^dr=0 is set, the control can be performed without causing the d-axis current error.

The present invention is achieved by the above theory, and can cause the d-axis current error to be zero by using the rotor-side d-axis magnetic flux estimated value estimated by the observer 50 instead of φ* (φ*=p^dr) of expression (20) which is a decoupling voltage calculation expression, thereby controlling the d-axis current.

Next, the effect obtained by using the magnetic flux estimated value p^dr of the observer 50 for the current instruction calculation unit 10 in the present invention, will be described.

The procedure of the description is as follows. First, what value the magnetic flux estimated value p^dr estimated by the observer 50 will become if the parameters vary, will be derived from an equation of state of the AC rotary machine 3 and a calculation expression of the observer 50, as shown by the following expression (29). In addition, in the conventional control method, the relationship of torque error in the case where the parameters vary will be derived from a torque calculation expression of the AC rotary machine 3 and a q-axis current instruction calculation expression of the current instruction calculation unit 10, as shown by expression (30) which is a relational expression of torque error. Further, from the relational expression of torque error, it will be shown that if the present invention is applied, the torque control for the AC rotary machine 3 can be performed without causing torque error, as shown by expression (31).

If the parameters do not vary, the observer 50 in the stationary state estimates the permanent magnet magnetic flux φa (=φ*) of the AC rotary machine 3. However, if some of the parameters vary, p^dr is not equal to φa.

Regarding the p^dr when the parameters vary, the following expression (27) is obtained by, in consideration of stationary state, approximating the equation of state, i.e., the following expression (26), of a permanent magnet synchronous electric motor which is the AC rotary machine 3, similarly to the case of the observer 50 (R=0, d/dt=0).

[Expression 23]

$$\begin{cases} \dfrac{d}{dt}\begin{pmatrix} \phi ds \\ \phi qs \\ \phi a \end{pmatrix} = \begin{pmatrix} -R/Ld & \omega & 0 \\ -\omega & -R/Lq & -\omega \\ 0 & 0 & 0 \end{pmatrix}\begin{pmatrix} \phi ds \\ \phi qs \\ \phi a \end{pmatrix} + \begin{pmatrix} Vd \\ Vq \\ 0 \end{pmatrix} \\ \begin{pmatrix} Id \\ Iq \end{pmatrix} = \begin{pmatrix} 1/Ld & 0 & 0 \\ 0 & 1/Lq & 0 \end{pmatrix}\begin{pmatrix} \phi ds \\ \phi qs \\ \phi a \end{pmatrix} \end{cases} \quad (26)$$

[Expression 24]

$$\begin{cases} 0 = \omega\,\phi qs + Vd \\ 0 = -\omega\,\phi ds - \omega\,\phi a + Vq \end{cases} \quad (27)$$

Here, from expression (27) and approximated expression (21) of the observer in the stationary state, the rotor-side d-axis magnetic flux estimated value p^dr can be derived as shown by the following expression (28).

[Expression 25]

$$\begin{aligned} \theta &= -\hat{\omega}\hat{p}ds - \hat{\omega}\hat{p}dr + Vq^* \\ -)\; \theta &= -\omega\phi ds - \omega\phi a + Vq \\ \hline \theta &= (\hat{p}ds - \phi ds) + (\hat{p}dr - \phi a) \\ &= (Ldob\,\hat{I}d - Ldob\,Id + Ldob\,Id - Ld\,Id) + (\hat{p}dr - \phi a) \\ &= (Ldob(\hat{I}d - Id) + (Ldob - Ld)Id) + (\hat{p}dr - \phi a) \end{aligned} \quad (28)$$

Here, in the stationary state, in accordance with the description of expression (25), if (I^d−Id)=0 is set, and if (Ldob−Ld)=ΔLd is set, the rotor-side d-axis magnetic flux estimated value p^dr is represented as a relational expression shown by the following expression (29).

[Expression 26]

$$\hat{p}dr = -\Delta Ld\,Id + \phi a \quad (29)$$

On the other hand, the relational expression of torque error when the parameters vary will be derived as shown below. The relational expression of torque error can be derived from the relationship between the torque calculation expression T of the AC rotary machine 3 and the torque instruction T* in the conventional control, as shown by the following expression (30). Here, Id*=Id, Iq*=Iq, Ldob−Ld=ΔLd, Lqob−Lq=£Lq, and φa−φ*=Δφ are set. In addition, the inductances are set as Ld*=Ldob and Lq*=Lqob.

[Expression 27]

$$\begin{aligned} T &= p(\phi a Iq + (Ld - Lq)Id Iq) \\ -)\; T^* &= p(\phi^* Iq^* + (Ld^* - Lq^*)Id^* Iq^*) \\ \hline \dfrac{(T - T^*)}{P} &= (\phi a - \phi^*)Iq^* + (Ld - Ld^* - Lq + Lq^*)Id^* Iq^* \\ &= \Delta\phi Iq^* + (-\Delta Ld + \Delta Lq)Id^* Iq^* \end{aligned} \quad (30)$$

In the relational expression of torque error shown by the above expression (30), if the parameters vary and error occurs on Ld, the terms on the right-hand side do not become zero as a whole, and therefore (T−T*) on the left-hand side does not become zero, either. That is, this shows that in the conventional control, if the parameters vary, torque error occurs. On the other hand, in the present invention, the magnetic flux estimated value p^dr of the observer 50 is used for the current instruction calculation unit 10, whereby expression (29) is obtained. Then, if ΔLq=0 and φ*=p^dr=−ΔLd·Id+φa are set and expression (29) is substituted into expression (30), the following expression (31) is obtained. Thus, it becomes possible to control torque error to be zero even under the condition that ΔLd is present.

[Expression 28]

$$\frac{(T-T^*)}{P} = (\phi a - (-\Delta L d I d^* + \phi a))Iq^* + (Ld - Ld^* - Lq + Lq^*)Id^*Iq^* \quad (31)$$
$$= \Delta L d I d^* Iq^* - \Delta L d I d^* iq^*$$
$$= 0$$

As described above, according to embodiment 1, if the parameters of the AC rotary machine 3 have varied to cause deviation from the target value of the control section, the variation in the parameters is reflected in the variation in the magnetic flux estimated value φ^ (p^dr) estimated by the observer 50. In addition, the magnetic flux estimated value φ^ (p^dr) estimated by the observer 50 is used for calculation of the current instructions Id* and Iq* by the current instruction calculation unit 10, and for calculation of the voltage instructions Vd* and Vq* by the voltage instruction calculation unit 20. Therefore, the torque can be accurately controlled.

In addition, the control system of embodiment 1 is configured as a so-called open-loop current control system which does not use a current control system based on a feedback value of detected current. Owing to such a configuration as an open-loop current control system, the control system can be applied over a wide range including the sine wave PWM control and the square wave drive method described in BACKGROUND ART, and accurate torque control can be realized even in the square wave drive method, without using feedback control based on estimated torque. Further, since the control system of embodiment 1 can be applied over a wide range including the sine wave PWM control and the square wave drive method without the need for switching of the control system, the torque control can be realized with a simple program. Still further, the present invention can realize accurate torque control even in a control apparatus that does not use a rotation rate sensor or a rotation position sensor for the AC rotary machine 3.

In the above description, the case where the present invention is applied to a sensorless vector control system that does not have a rotation rate sensor or a rotation position sensor, has been described. However, even in the case where the present invention is applied to a vector control system having a rotation rate sensor or the like, the same effect can be obtained.

Embodiment 2

Figure 7:
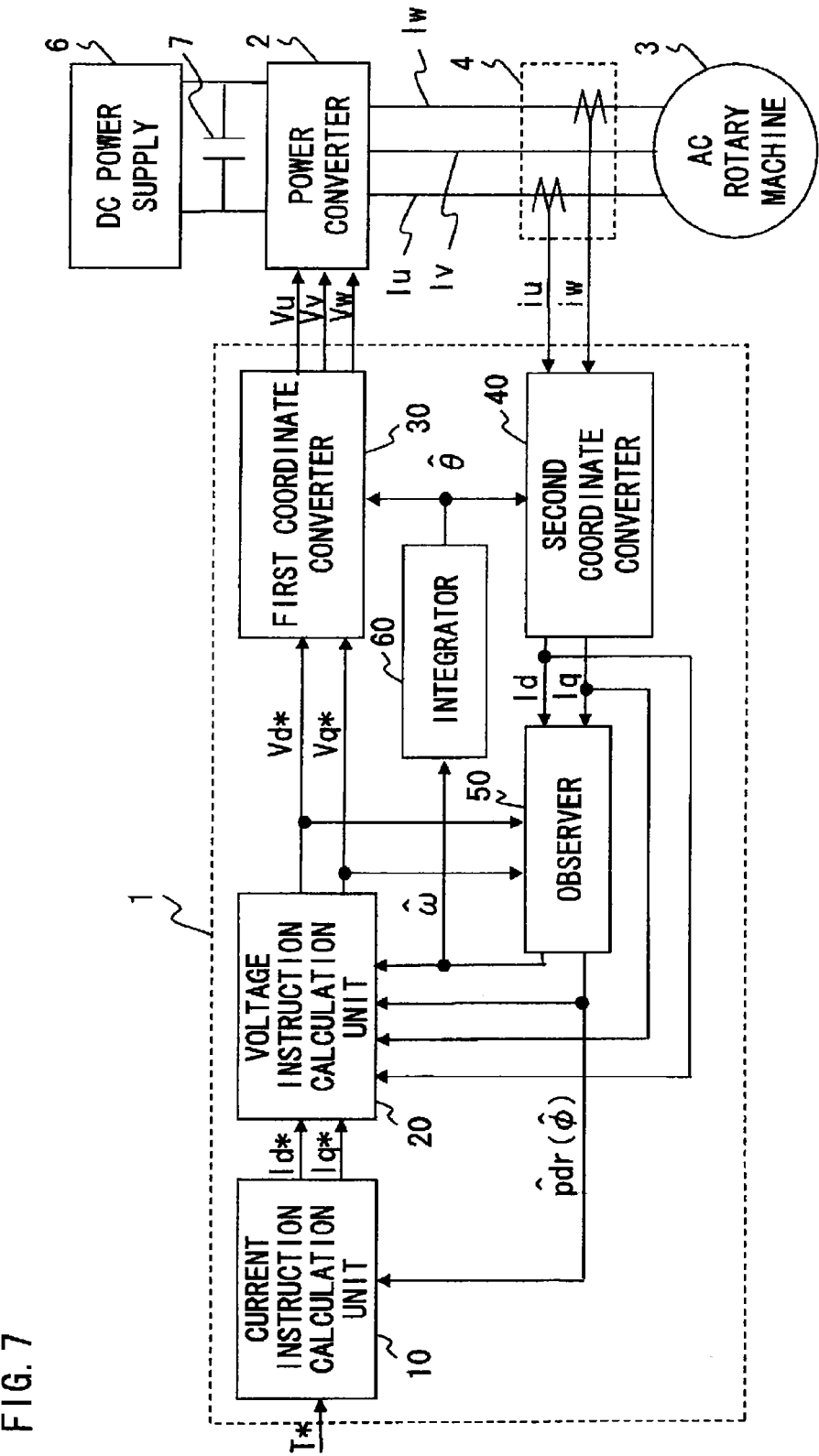
FIG. 7 is a block diagram of a control apparatus for an AC rotary machine according to embodiment 2 of the present invention.

FIG. 7 is a block diagram showing a control apparatus for an AC rotary machine according to embodiment 2 of the present invention. Components that are the same as or correspond to those of embodiment 1 shown in FIG. 1 are denoted by the same reference numerals.

Figure 8:
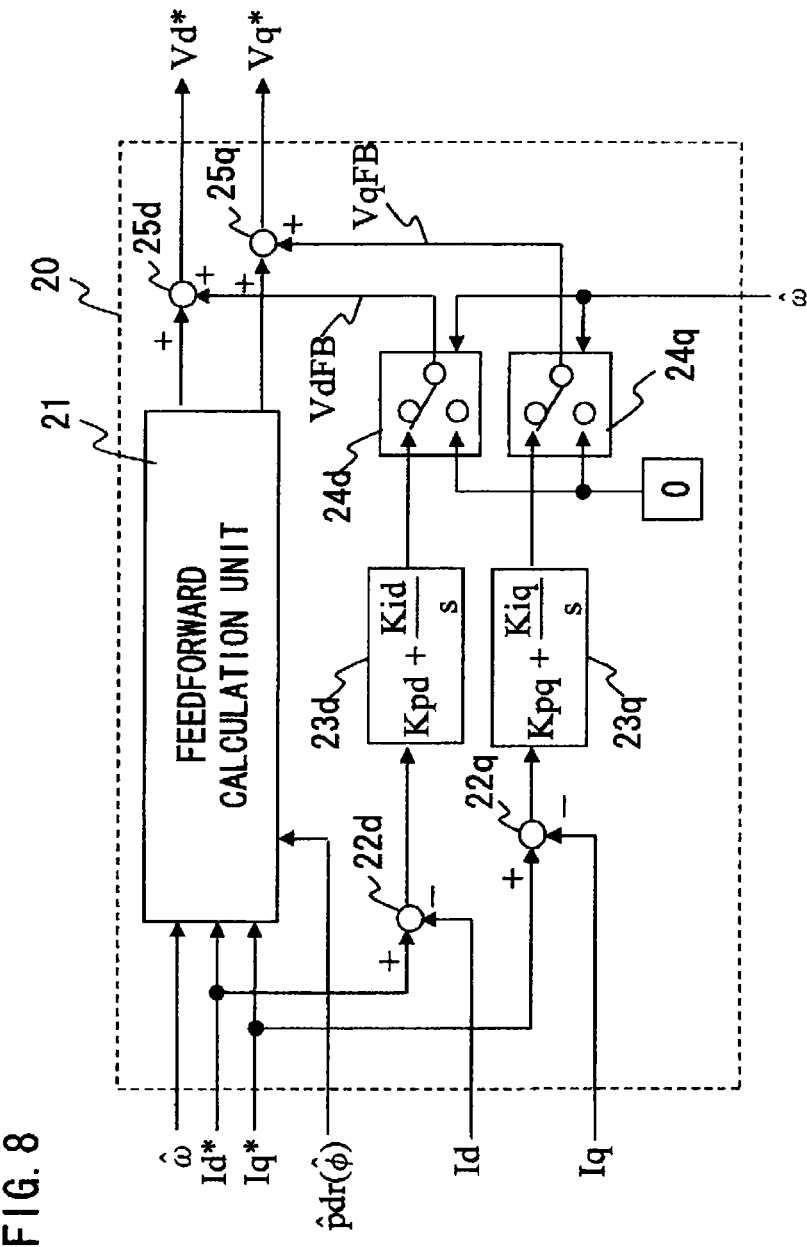
FIG. 8 is a block diagram of a voltage instruction calculation unit of the control apparatus for an AC rotary machine according to embodiment 2 of the present invention.

A feature of the control apparatus for an AC rotary machine of embodiment 2 is that the configuration of the voltage instruction calculation unit 20 (FIG. 4) shown in embodiment 1 is modified, that is, replaced with the voltage instruction calculation unit 20 having a configuration shown in FIG. 8. Except for the voltage instruction calculation unit 20, the configuration is basically the same as that of embodiment 1. Therefore, the detailed description thereof is omitted.

In the voltage instruction calculation unit 20 of embodiment 2, its calculation of the voltage instructions Vd* and Vq* additionally includes feedback control of the detected currents Id and Iq obtained by the second coordinate converter 40.

The calculation expressions in this case are as follows. That is, current feedback terms are calculated by the following expression (32), and voltage feedforward terms are calculated by the following expression (33). Then, final voltage instructions Vd* and Vq* are calculated by expression (34).

[Expression 29]

$$\begin{cases} VdFB = \left(Kpd + \frac{Kid}{s}\right)(Id^* - Id) \\ VqFB = \left(Kpq + \frac{Kiq}{s}\right)(Iq^* - Iq) \end{cases} \quad (32)$$

[Expression 30]

$$\begin{bmatrix} VdFF \\ VqFF \end{bmatrix} = \begin{bmatrix} R^* & -\hat{\omega}Lq^* \\ \hat{\omega}Ld^* & R^* \end{bmatrix}\begin{bmatrix} Id^* \\ Iq^* \end{bmatrix} + \begin{bmatrix} 0 \\ \hat{\omega}\hat{p}dr \end{bmatrix} \quad (33)$$

[Expression 31]

$$\begin{cases} Vd^* = VdFF + VdFB \\ Vq^* = VqFF + VqFB \end{cases} \quad (34)$$

Here, VdFB and VqFB are feedback terms, VdFF and VqFF are feedforward terms, Kpd and Kpq are proportional gains, and Kid and Kiq are integral gains.

The feedback terms VdFB and VqFB in the above expression (32) are calculated by subtractors 22d and 22q and PI calculation units 23d and 23q shown in FIG. 8. The feedforward terms VdFF and VqFF in expression (33) are calculated by a feedforward calculation unit 21 shown in FIG. 8 having the same configuration as in embodiment 1 (FIG. 4). The calculation in expression (34) is realized by adders 25d and 25q shown in FIG. 8.

As previously described, in embodiment 1, the theory is developed ignoring resistance error. Actually, in a region where the AC rotary machine 3 rotates at a high speed to a certain degree so that the induced voltage of the AC rotary machine 3 is large to a certain degree, even if resistance error occurs, the resistance error hardly influences the output torque of the AC rotary machine 3.

However, in a region where the AC rotary machine 3 rotates at a low speed, resistance error cannot be ignored. Accordingly, as in the voltage instruction calculation unit 20 shown in FIG. 8, feedback control of the detected currents Id and Iq is added. Thus, voltage error caused by the resistance error is compensated, whereby the current can be accurately controlled.

It is noted that, as a difference between the configuration of embodiment 2 and the conventional technique, the magnetic flux estimated value φ^ (p^dr: the rotor-side d-axis magnetic flux estimated value) estimated by the observer 50 is used for calculation of the feedforward terms. Owing to this configuration, errors on the d-q axis inductance set values and the magnetic flux set value are compensated by the feedforward terms VdFF and VqFF, and the other errors such as resistance error can be compensated by the current feedback terms VdFB and VqFB, thereby obtaining the effect of improving the response of current feedback control when the parameters vary.

Further, in the voltage instruction calculation unit 20 of embodiment 2, switches 24d and 24q that can turn on or off current feedback control are provided between the PI calculation units 23d and 23q and the adders 25d and 25q. Then, only when the AC rotary machine 3 rotates at a low speed, current feedback control is performed, and in the other cases, the switches 24d and 24q are switched to turn off current feedback control. Thus, the torque control can be accurately performed for the AC rotary machine over a wide rotation rate region from zero to a high speed.

As described above, according to embodiment 2, by employing the voltage instruction calculation unit 20 having the configuration shown in FIG. 8 to add current feedback control, it becomes possible to favorably control the current when resistance error occurs, and to accurately suppress torque variation even when the AC rotary machine 3 rotates at a low speed.

Embodiment 3

Figure 9:
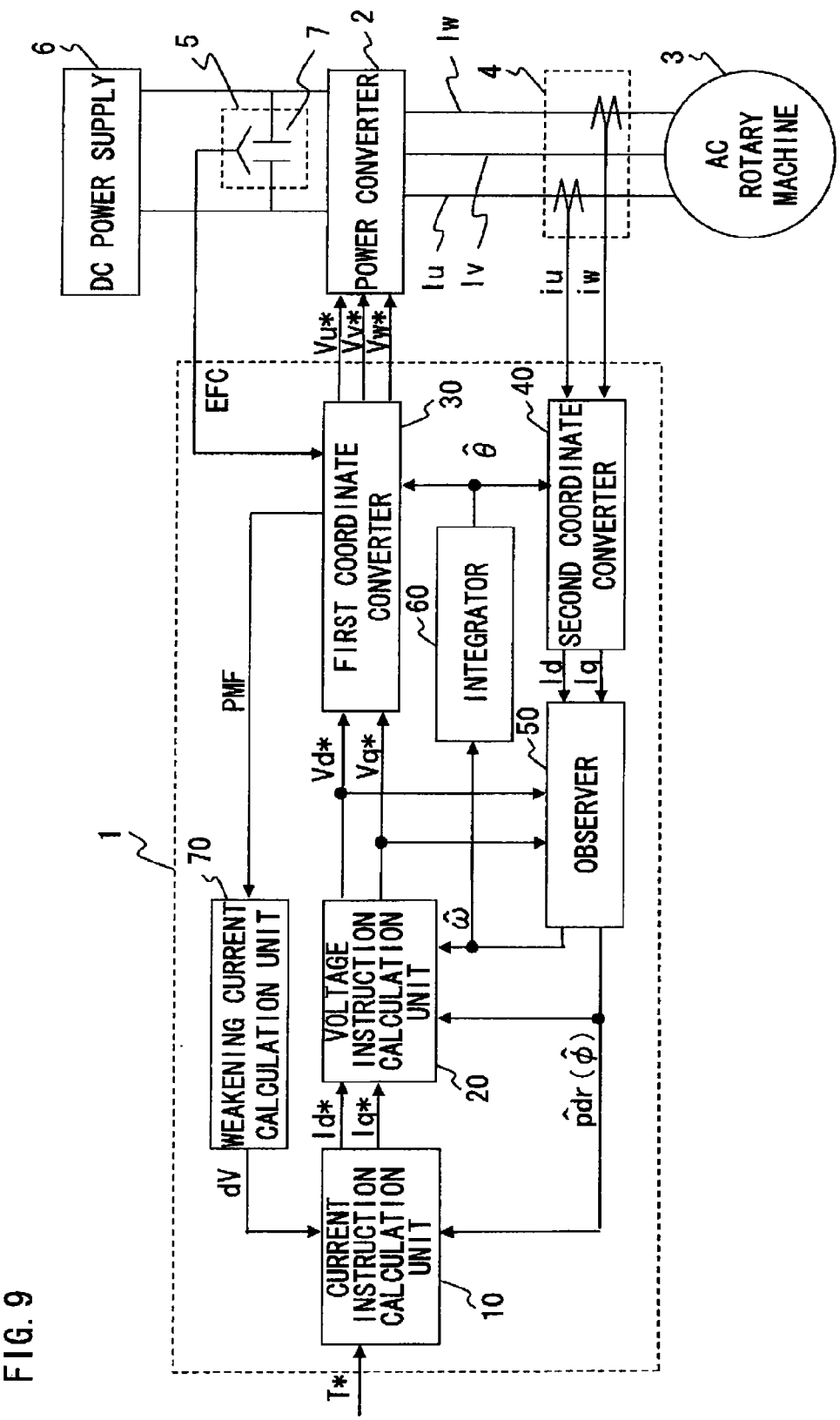
FIG. 9 is a block diagram of a control apparatus for an AC rotary machine according to embodiment 3 of the present invention.

FIG. 9 is a block diagram showing a control apparatus for an AC rotary machine according to embodiment 3 of the present invention. Components that are the same as or correspond to those of embodiment 1 shown in FIG. 1 are denoted by the same reference numerals.

A feature of the control apparatus for an AC rotary machine according to embodiment 3 is that, as compared to embodiment 1, a voltage detection section 5 is newly added to detect DC voltage EFC applied to the power converter 2 by the DC power supply 6, and in the control section 1, a weakening current calculation unit 70 is newly added to calculate the weakening current instruction dV from a modulation factor PMF such that the modulation factor PMF will become "1". Except for the above components, the configuration is the same as that of embodiment 1. Therefore, the detailed description thereof is omitted.

In this case, the first coordinate converter 30 calculates the modulation factor PMF as shown by the following expression (35).

[Expression 32]

$$PMF = \frac{\sqrt{(Vd^*)^2 + (Vq^*)^2}}{\frac{\sqrt{6}}{\pi} EFC} \quad (35)$$

The calculation expression for the modulation factor PMF shown by expression (35) is for performing calculation such that the maximum voltage that can be outputted by the power converter 2 satisfies PMF=1 in the square wave drive method. By controlling the modulation factor PMF so as to satisfy PMF=1, torque control based on the square wave drive method can be realized.

Then, the three-phase voltage instructions Vu*, Vv*, and Vw* are calculated from the modulation factor PMF shown by expression (35). Thus, even if the DC voltage EFC applied to the power converter 2 varies, it is possible to always apply appropriate voltage to the AC rotary machine 3, thereby suppressing torque variation due to the variation in the DC voltage EFC.

Figure 10:
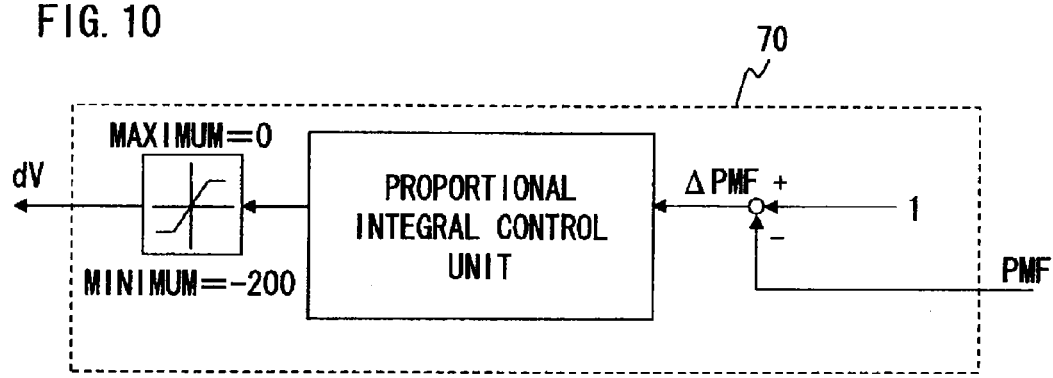
FIG. 10 is a block diagram of a weakening current calculation unit of the control apparatus for an AC rotary machine according to embodiment 3 of the present invention.

FIG. 10 is a diagram showing the configuration of the weakening current calculation unit 70 for realizing magnetic flux weakening control based on the square wave drive method. It is noted that the configuration shown in FIG. 10 is a known technique, which only has to allow the weakening current instruction dV to be generated such that the modulation factor PMF will become "1".

As described above, according to embodiment 3, based on the configuration of embodiment 1, the voltage detection section 5 which detects the DC voltage EFC is provided to calculate the modulation factor PMF by expression (35), and the weakening current calculation unit 70 calculates an optimum weakening current instruction value dV such that the modulation factor PMF will become "1". Therefore, even if the DC voltage EFC inputted to the power converter 2 varies, an optimum weakening current instruction can be generated. In addition, in the square wave drive method, it is possible to effectively suppress occurrence of torque error even if the DC voltage EFC varies, as well as suppressing occurrence of torque error due to the parameter variation of the AC rotary machine 3 as in embodiment 1.

Industrial Applicability

The present invention relates to a control apparatus which controls the torque of an AC rotary machine based on a torque instruction, and is applicable to various control apparatuses for an AC rotary machine.

The invention claimed is:

1. A control apparatus for an AC rotary machine, the control apparatus comprising:
   a power converter which converts DC power to AC power and supplies the AC power to the AC rotary machine;
   a current detection section which detects current flowing from the power converter to the AC rotary machine; and
   a control section which generates a three-phase AC voltage instruction value for controlling the AC rotary machine, to the power converter, based on the detected current detected by the current detection section and a torque instruction value, wherein
   the control section includes: a current instruction calculation unit which calculates a current instruction value; a voltage instruction calculation unit which calculates the voltage instruction value; and an observer which calculates a magnetic flux estimated value and an angular velocity estimated value of the AC rotary machine, based on the detected current and the voltage instruction value,
   the current instruction calculation unit calculates current instruction values on rotational two axes, based on the torque instruction value, and the magnetic flux estimated value outputted from the observer,
   the voltage instruction calculation unit calculates the voltage instruction value, based on the current instruction values outputted from the current instruction calculation unit, and the magnetic flux estimated value and the angular velocity estimated value outputted from the observer, and sensorless vector control is performed based on the angular velocity estimated value.

2. The control apparatus for an AC rotary machine according to claim 1, wherein
   the voltage instruction calculation unit calculates a voltage instruction value, based on a calculation result outputted from the observer and feedback calculation of a current deviation between the current instruction values and the detected current.

3. The control apparatus for an AC rotary machine according to claim 2, the control apparatus further comprising:
   a voltage detection section which detects DC voltage inputted to the power converter; and
   a weakening current calculation unit which calculates a weakening current instruction for controlling a modulation factor calculated from a DC voltage detected value detected by the voltage detection section and the voltage instruction value, so as to cause the modulation factor to be equal to or smaller than a predetermined value.

4. A control apparatus for an AC rotary machine, the control apparatus comprising:
- a power converter which converts DC power to AC power and supplies the AC power to the AC rotary machine;
- a current detection section which detects current flowing from the power converter to the AC rotary machine; and
- a control section which generates a three-phase AC voltage instruction value for controlling the AC rotary machine, to the power converter, based on the detected current detected by the current detection section and a torque instruction value, wherein
- the control section includes: a current instruction calculation unit which calculates a current instruction value; a voltage instruction calculation unit which calculates the voltage instruction value; and an observer which calculates a magnetic flux estimated value and an angular velocity estimated value of the AC rotary machine, based on the detected current and the voltage instruction value,
- the current instruction calculation unit calculates current instruction values on rotational two axes, based on the torque instruction value, and the magnetic flux estimated value outputted from the observer, and
- the voltage instruction calculation unit calculates the voltage instruction value, based on the current instruction values outputted from the current instruction calculation unit, and the magnetic flux estimated value and the angular velocity estimated value outputted from the observer, and calculates the voltage instruction value, based on a calculation result outputted from the observer and feedback calculation of a current deviation between the current instruction values and the detected current.

5. The control apparatus for an AC rotary machine according to claim 4, the control apparatus further comprising:
- a voltage detection section which detects DC voltage inputted to the power converter; and
- a weakening current calculation unit which calculates a weakening current instruction for controlling a modulation factor calculated from a DC voltage detected value detected by the voltage detection section and the voltage instruction value, so as to cause the modulation factor to be equal to or smaller than a predetermined value.

* * * * *

UNITED STATES PATENT AND TRADEMARK OFFICE
CERTIFICATE OF CORRECTION

PATENT NO. : 8,836,253 B2
APPLICATION NO. : 13/809451
DATED : September 16, 2014
INVENTOR(S) : Sho Kato et al.

It is certified that error appears in the above-identified patent and that said Letters Patent is hereby corrected as shown below:

In the Specification

Column 5, line 37, the expression:

$$Id1^* = \frac{-\{(aP\hat{p}dr) + bP(Ld^* - Lq^*)\} \pm \sqrt{\{(aP\hat{p}dr) + bP(Ld^* - Lq^*)\}^2 - 4\{aP(Ld^* - Lq^*)\}(bP\hat{p}dr - T^*)}}{2\{aP(Ld^* - Lq^*)\}} \quad (1)$$

should be changed to :

$$Id1^* = \frac{-\{(aP\,\hat{p}dr) + bP(Ld^* - Lq^*)\} \pm \sqrt{\{(aP\,\hat{p}dr) + bP(Ld^* - Lq^*)\}^2 - 4\{aP(Ld^* - Lq^*)\}(bP\,\hat{p}dr - T^*)}}{2\{aP(Ld^* - Lq^*)\}} \quad (1)$$

Column 12, line 16, the expression:

$$\begin{cases} 0 = \hat{\omega}\,\hat{p}qs + Vd^* \\ 0 = \hat{\omega}\,\hat{p}ds - \hat{\omega}\,\hat{p}dr + Vq^* \end{cases} \quad (21)$$

should be changed to:

$$\begin{cases} 0 = \hat{\omega}\,\hat{p}qs + Vd^* \\ 0 = -\hat{\omega}\,\hat{p}ds - \hat{\omega}\,\hat{p}dr + Vq^* \end{cases} \quad (21)$$

Signed and Sealed this
Third Day of February, 2015

Michelle K. Lee
*Deputy Director of the United States Patent and Trademark Office*